(12) United States Patent
Alfano et al.

(10) Patent No.: US 7,860,072 B2
(45) Date of Patent: Dec. 28, 2010

(54) ROUTING OPTIMIZATION IN A WIRELESS NETWORK USING IP PACKETS TO CONVEY USER INFORMATION

(75) Inventors: Frank M. Alfano, Wheaton, IL (US); Peter J. McCann, Naperville, IL (US); Patrick J. Walsh, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 733 days.

(21) Appl. No.: 11/647,754

(22) Filed: Dec. 29, 2006

(65) Prior Publication Data

US 2008/0159241 A1    Jul. 3, 2008

(51) Int. Cl.
*H04W 4/00* (2009.01)

(52) U.S. Cl. .................. 370/338; 370/328; 370/392; 455/428; 455/445; 455/524; 455/525

(58) Field of Classification Search .............. 370/229, 370/328, 310, 338, 392; 455/432.1–433, 455/435.1, 436, 445, 428, 524–525
See application file for complete search history.

(56) References Cited

U.S. PATENT DOCUMENTS

2002/0080752 A1\* 6/2002 Johansson et al. ........... 370/338
2009/0161604 A1\* 6/2009 Guan ......................... 370/328

\* cited by examiner

*Primary Examiner*—Nick Corsaro
*Assistant Examiner*—Quan M Hua
(74) *Attorney, Agent, or Firm*—Carmen Patti Law Group, LLC

(57) ABSTRACT

An exemplary method implements route optimization in an IP telecommunication network that supports wireless mobile stations (MSs). IP address information related to packet flow for MSs is identified and stored in records at a local mobility anchor point (LMAP). The records are compared to determine matching pairs, i.e. records that represent that a first MS is engaged in a communication session with a second MS. First and second points of attachment nodes are determined that support the first and second MS, respectively, based on IP address information contained in a matching pair of records associated with the first and second MS. A route optimization (RO) message is transmitted to the first and second point of attachment nodes, where the RO message includes an IP address of the other point of attachment node. The RO messages represent a request for the first and second point of attachment nodes to address packets sent between the first and second MS with a source address of one of the first and second point of attachment nodes and a destination address of the other of the first and second point of attachment nodes.

18 Claims, 3 Drawing Sheets

ROUTING OPTIMIZATION IN A WIRELESS NETWORK USING IP PACKETS TO CONVEY USER INFORMATION

BACKGROUND

This invention relates to wireless network infrastructures that use internet protocol (IP) to route packets carrying a wireless subscriber's information, and more specifically to a method for controlling the paths over which such packets travel.

One of the challenges encountered by wireless infrastructure systems that use IP packets to convey subscriber information resides in how to accomplish route optimization. It is desirable to minimize the number of nodes that an IP packet must traverse, i.e. optimize the route, in order to enhance reliability and minimize delays associated with the delivery of the information contained in the packets.

A current method for client-mobile IP (MIP) route optimization utilizes twelve over-the-air (OTA) messages between a mobile station (MS) and the network that have to be exchanged in order to accomplish a resulting route optimization. If the user's communication is with another MS, another twelve messages between this MS and the network will be required for route optimization. On wireless links such a method can be costly and cause delays in the network. Therefore, a need exists for an improved method to accomplish route optimization in a wireless IP infrastructure system.

SUMMARY

It is an object of the present invention to satisfy this need.

An exemplary method implements route optimization in an IP telecommunication network that supports wireless mobile stations (MSs). IP address information related to packet flow for MSs is identified and stored in records at a local mobility anchor point (LMAP). The records are compared to determine matching pairs, i.e. records that represent that a first MS is engaged in a communication session with a second MS. First and second point of attachment nodes are determined that support the first and second MS, respectively, based on IP address information contained in a matching pair of records associated with the first and second MS. A route optimization (RO) message is transmitted to the first and second point of attachment nodes, where the RO message includes an IP address of the other point of attachment node. The RO messages represent a request for the first and second point of attachment nodes to address packets sent between the first and second MS with a source address of one of the first and second point of attachment nodes and a destination address of the other of the first and second point of attachment nodes.

Another embodiment of the present invention includes one or more LMAPs that practice or assisted in practicing the subject method.

DESCRIPTION OF THE DRAWINGS

Features of exemplary implementations of the invention will become apparent from the description, the claims, and the accompanying drawings in which:

DETAILED DESCRIPTION

An overview of aspects of the present invention will aid in the understanding of the below implementations for optimization routing. It is desirable for an early, if not the first, node in the network, that transmits IP packets carrying information originated by a wireless MS towards a recipient, to be able to address and transmit such packets to the network node closely associated with the recipient. That is, it is desirable to create a path for user packets in the IP network that contains a minimum number of intermediate nodes. In order to provide the first IP node with the address of a destination IP node to be utilized after route optimization has been completed, a higher level network node, e.g. a local mobility anchor point (LMAP), is utilized to collect the required addressing information in a table and transmit the identity of a destination node that is close to the recipient to the origination node. Likewise, the higher level network node also transmits the address of the origination node to the destination node. This enables the origination node and the destination node to transmit IP packets directly to each other carrying information communicated between the two parties so that the transmitted IP packets do not require further re-addressing by any intermediate nodes. Of course, the infrastructure may utilize intermediate transport IP nodes, e.g. a router, that merely route packets to the intended (addressed) destinations without requiring re-addressing. Such transport nodes may still be used for packet transport even after route optimization.

Figure 1:
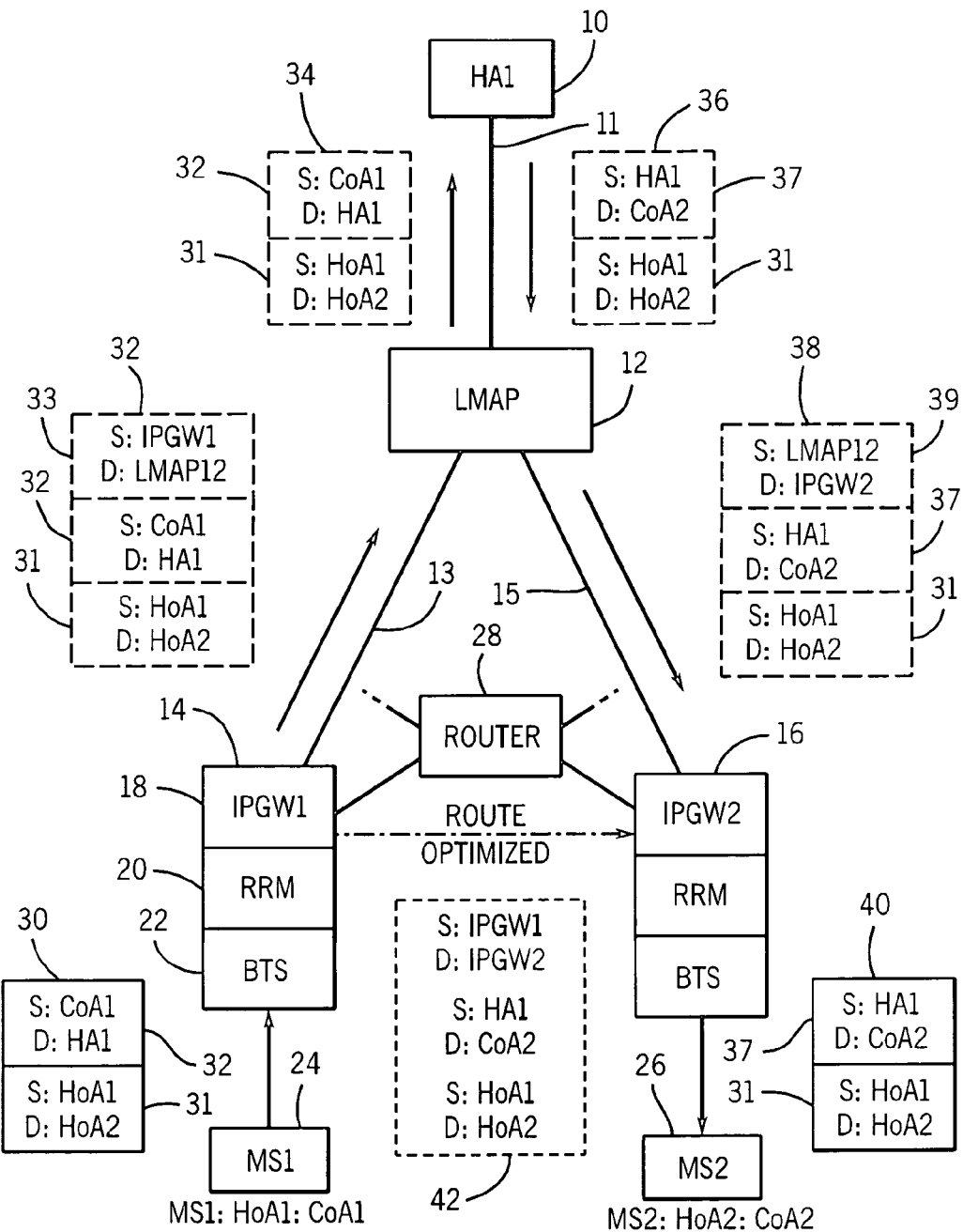
FIG. 1 is a block diagram of an illustrative example of a wireless system utilizing IP infrastructure equipment suited for incorporation of an embodiment of the present invention.

FIG. 1 shows an illustrative block diagram of a wireless system utilizing IP infrastructure equipment suited for implementation of an exemplary method for implementing route optimization. The general architecture of the infrastructure equipment includes a home agent (HA) 10 that supports and provides registration, authorization, administration and location management for a plurality of wireless subscribers. A LMAP node 12 is coupled to HA 10 by path 11 and provides an "anchor" for a communication session initiated with a mobile station. Other LMAP nodes (not shown) may be utilized as part of the IP infrastructure system and would in this example be connected with HA 10. Where a MS travels such that its radio frequency (RF) link is handed off from one base station (22) to another base station, and possibly handled off from one supporting IP gateway to another supporting IP gateway, the same LMAP node 12 that was responsible for the initial communications with the MS typically continues to maintain responsibility for managing communications with the MS during the ongoing call regardless of which base station or IP gateway supports the MS.

Point of attachment nodes 14 and 16 provide an interface between the IP based communications used in the IP network and the RF communications link with the MS. End point nodes 14, 16 and others not shown have the same structure and configuration. Thus, only point of attachment point node 14 need be described. It includes an IP gateway (IPGW) 18 that provides origination and termination for IP packets from and to the MS 24 (also referred to as MS1). A radio resource manager (RRM) 20 provides radio resource management for the one or more base stations 22 utilized to provide an RF link with a plurality of mobile stations, such as MS1. Point of attachment node 16, which is coupled to LMAP node 12 by path 15, provides similar support for other mobile stations, such as MS 26 (also referred to as MS2). Router 28, coupled to nodes 16, 18 and others not shown, provides conventional packet routing functionality.

The LMAP may be constructed of a microprocessor that is supported by read only memory (ROM), random access memory (RAM), and nonvolatile data storage that may comprise a hard drive. An input/output (I/O) interface is coupled to the microprocessor and provides a communication interface between the microprocessor and communication channels coupling the LMAP to other devices/nodes. The microprocessor operates under stored control instructions normally stored in ROM and in the nonvolatile data storage element that are transferred during active operation to RAM. The nonvolatile data storage element should have a data storage capacity sufficient to accommodate the route optimization tables. Control instructions enable the LMAP to perform the functions as described below.

Figure 2:
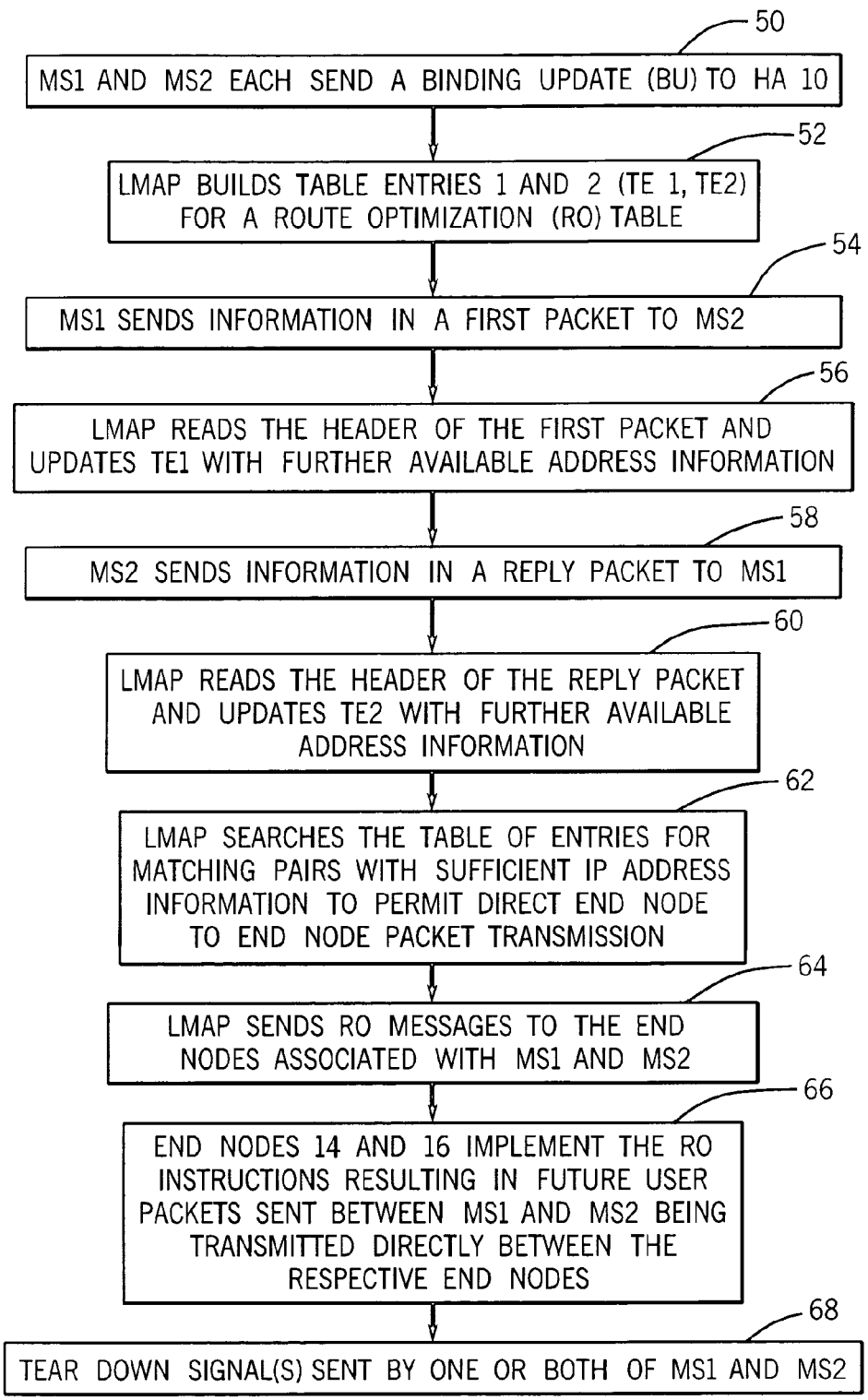
FIG. 2 is a flow diagram of an illustrative method in accordance with the present invention for implementing route optimization for the wireless system shown in FIG. 1.

FIG. 2 is a flow chart of an illustrative method for implementing route optimization for the exemplary system of FIG. 1. It will be best understood by also referring to the illustrative packet header addresses shown in FIG. 1. Packet header addresses with solid line outlining represent messages sent both before and after route optimization; packet header addresses with dashed line outlining represent messages sent only before route optimization; packet header addresses with dotted line outlining represent messages sent only after route optimization. The packet header addresses are only shown for a packet flow from MS1 to MS2 to keep the figure from becoming unduly crowded. Those skilled in the art will appreciate that the reverse packet flow will be performed using complementary packet header addressing.

FIG. 2 shows a flow diagram of illustrative steps in accordance with an embodiment of the present invention. The illustrative method shows a process by which route optimization may be implemented so that packets transmitted between MS1 and MS2 carrying user information, e.g. a call carrying voice information, will be addressed and transmitted between the end nodes 16 and 18 without requiring additional IP header addressing inserted by an intermediate node. In this embodiment the IP format utilized is IPv6.

In step 50 MS 1 and MS2 each send a binding update (BU) to HA 10 by which the mobile stations are authenticated/authorized and routing addresses assigned so that the HA can direct future communications to the mobile stations. In step 52 the LMAP builds table entries 1 and 2 (TE1 and TE2) as part of a route optimization (RO) table based on information obtained from the addresses in packets that flow between MS1/MS2 and HA1 as part of the binding update. The RO table is stored in LMAP or a database associated with LMAP and is updated by and maintained by LMAP.

| Table Entry 1 | | | | | | |
|---|---|---|---|---|---|---|
| TE1 | HoA1 | | CoA1 | HA1 | | LMAP_ID |

| Table Entry 2 | | | | | | |
|---|---|---|---|---|---|---|
| TE2 | HoA2 | | CoA2 | HA2 | | LMAP_ID |

The above header address information means as follows.

HoA1 home address of MS1

CoA1 care-of address of MS1

HA1 address of home agent (HA 10) serving MS1

LMAP_ID address indented the of the LMAP that created the subject table entry

HoA2 home address of MS2

CoA2 care-of address of MS2

HA2 address of home agent serving MS2

Since TE1 and TE2 represent address information discerned by LMAP during the BU by MS1 and MS2, the blank fields represent address information that is unavailable to the LMAP until user traffic from a mobile station is initiated. In step 54 MS1 sends information in a first packet to MS2. In step 56 the LMAP reads in the header of the first packet and updates TE1 with further available address information as shown in Table Entry 1 Update.

| Table Entry 1 Update | | | | | | | |
|---|---|---|---|---|---|---|---|
| TE1 | HoA1 | HoA2 | CoA1 | | HA1 | HA2 | IPGW1 | LMAP_ID |

The updated TE1 includes identification of the home address of the recipient mobile MS2 (HoA2) and identification of the IP gateway that currently supports MS1 (IPGW1) for the requested call session. The only missing address field from the updated TE1 entry is the care-of address of the recipient MS2.

Because MS2 has undergone a BU with HA1, the first packet from MS1 can be routed to MS2 using the information available to HA1. As shown in FIG. 1, the first packet is forwarded towards its destination using address information 30 which includes destination and source address pairs 31 and 32 utilized between MS 1 and end node 14. IP address header 32 contains address pairs 31, 32 and 33 as used between node 14 and LMAP 12; IP address header 34 contains address pairs 31 and 32 as used between LMAP 12 and HA1. The first packet is thus routed to HA1.

Using the previously stored information by HA1 obtained during the BU by MS2, the first packet is addressed with header 36 containing address pairs 31 and 37 wherein the care-of address for MS2 specifies routing for LMAP 12. The LMAP 12 is aware that MS2 is to be supported by IPGW2 of node 16 and re-addresses the first packet with header 38 containing address pairs 31, 37 and 39, and transmits it to node 16. This packet is processed by node 16 and the information is transmitted over the RF link between the base station of node 16 and MS2 using header address information 40 which includes destination and source pairs 31 and 37. Therefore, the first packet originated by MS1 has reached MS2 over the following path: MS1, node 14, LMAP 12, HA1, LMAP 12, node 16, MS2. It will be noted that five intermediate nodes were required to read, process and re-transmit the packet prior to its reaching the MS2 destination.

In step 58 MS2 sends a reply packet to MS1. The reply packet traverses the reverse path taken by the first packet to reach MS1. In step 60 the LMAP reads the header of the reply packet and updates TE2 with further available address information.

| Table Entry 2 Update | | | | | | | |
|---|---|---|---|---|---|---|---|
| TE2 | HoA2 | HoA1 | CoA2 | | HA2 | HA1 | IPGW2 | LMAP_ID |

The updated TE2 includes identification of the home address of the recipient of the reply packet, mobile MS1 (HoA1), and identification of the IP gateway that currently supports MS2 (IPGW2) for the requested call session. The only missing address field from the updated TE2 entry is the care-of address of the recipient MS1.

In step 62 the LMAP periodically scans the RO table, which is itself being continually updated with new information, to locate matching pairs of entries, i.e. table entries in which both parties are served by the LMAP and are in communication with each other. For example, a matching pair of entries in the table could be determined based on entries that identify the same LMAP, that identify an IPGW supported by the LMAP, and that have mating final source/destination addresses, i.e. [HoA1:HoA2: . . . ] for one entry and [HoA2: HoA1: . . . ]) for the mating entry. Finding such a pair of entries represents that the two parties are in communications with each other and that both parties are supported by an IP gateway in a hierarchy beneath the same LMAP. Once matching entries are identified, the missing care-of address in each of the updated table entries will be known based on the corresponding care-of address contained in the other entry of the matching pair, i.e. [CoA1] will be identified in one entry and [CoA2] will be identified in the other entry. Therefore, the LMAP now has complete address information, as shown in the Completed Table Entries table below, relating to the normal transmission path of communications between these two parties.

Completed Table Entries

| TE1 | HoA1 | HoA2 | CoA1 | CoA2 | HA1 | HA2 | IPGW1 | LMAP_ID |
|---|---|---|---|---|---|---|---|---|
| TE2 | HoA2 | HoA1 | CoA2 | CoA1 | HA2 | HA1 | IPGW2 | LMAP_ID |

In step 64 the LMAP transmits RO messages to the end nodes associated with MS1 and MS2. The RO messages identify the addresses of respective IP gateways to be used for ongoing session communications between MS1 and MS2. In step 66 the RO messages also provide a command that is interpreted by the point of attachment nodes 14 and 16 to cause these end nodes to address user packets transmitted between MS1 and MS2 directly to the corresponding IP gateway of the other party. In FIG. 1, the IP header 42 illustrates the routing of a packet from MS1 to MS2 in which the highest level source address corresponds with the IP gateway that supports MS1 and the highest level destination address corresponds with the IP gateway that supports MS2. That is, after route optimization implementation, packets transmitted from MS1 to MS2 will traverse the following path: MS1, node 14, node 16, MS2. Similarly, packets transmitted from MS2 to MS1 will traverse this path in reverse.

In step 68 a tear down signal is sent by one or both of the parties signifying an end of the call and the communication session. Because this is a system command signal, and not user communications having another user as a destination, this information will be passed by the network to its intended destination, e.g. a call tear down by MS1 would be passed by node 14 to LMAP 12 and to HA1 so that known system actions such as billing and subscriber availability information will be updated.

Figure 3:
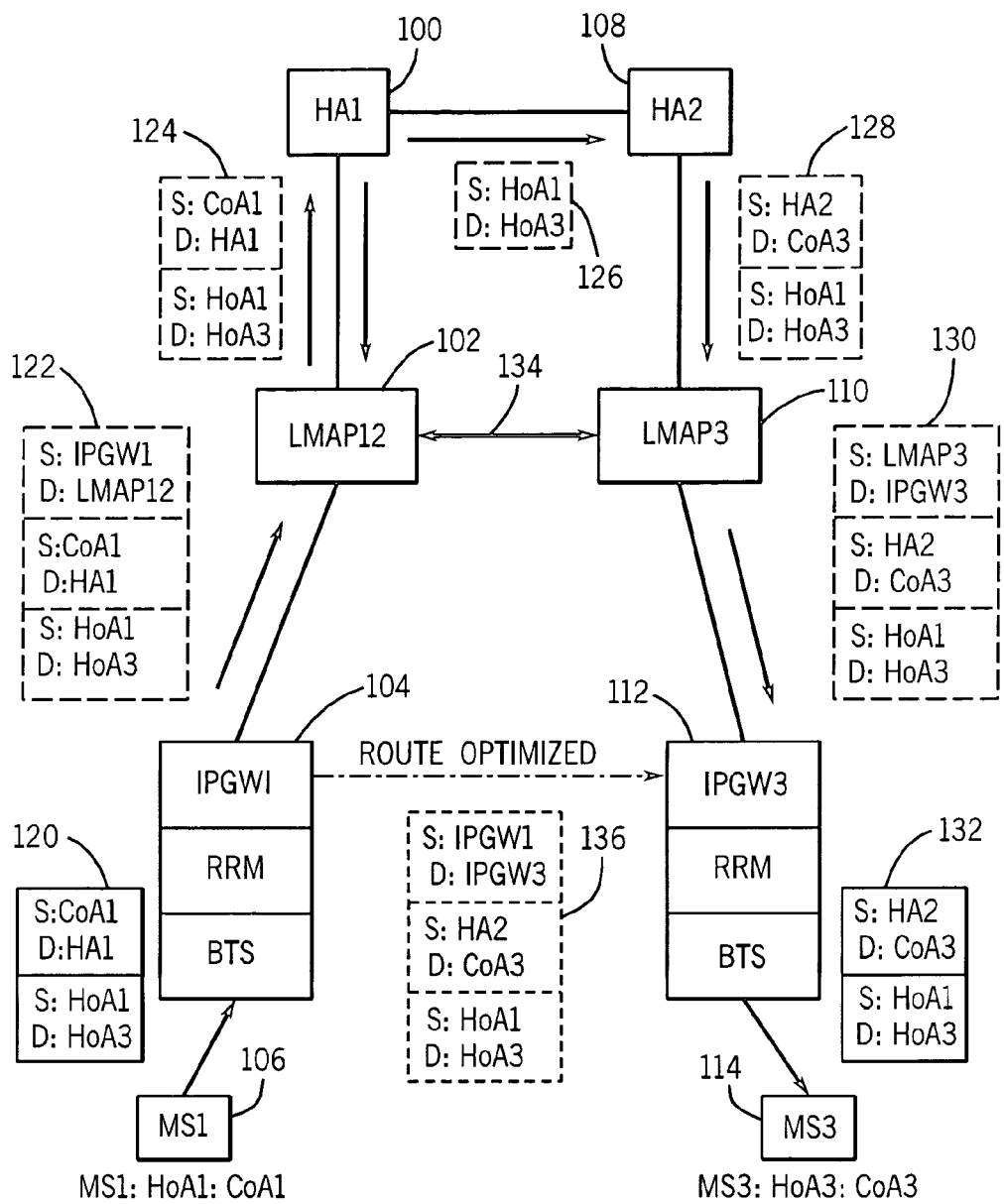
FIG. 3 is a block diagram of another illustrative example of a wireless system utilizing IP infrastructure equipment suited for incorporation of another embodiment of the present invention.

FIG. 3 is a block diagram of another embodiment of a wireless network system in accordance with the present invention. This embodiment differs from the embodiment of FIG. 1 in that it includes more than one home agent and more than one LMAP. Home agent 100 (HA1) supports local mobility anchor point 102 (LMAP 12) which in turn supports point of attachment 104 having the same elements as the points of attachment described in FIG. 1. Wireless mobile station 106 (MS1) is supported by point of attachment node 104. Home agent 108 (HA2) supports local mobility anchor point 110 (LMAP3) which in turn supports point of attachment node 112 that provides wireless communications for mobile station 114 (MS3).

Both MS1 and MS3 will have undergone a binding update with HA1 and HA2, respectively, in order to register the mobile stations and establish locations, i.e. communication paths, with the respective home agents. Packet headers 120 through 132 illustrate the source/destination pairs for packets between the respective nodes for the transmission of a first packet from MS1 to MS3 prior to route optimization. In this system, HA1 and HA2 will have previously exchanged information so that HA1 will understand that the first packet destined for MS3 is to be transferred for handling to HA2. Packets transmitted by MS3 for MS1 will traverse the same path in reverse with appropriate packet headers (not shown) between the respective nodes prior to route optimization.

LMAP12 will construct a table entry of IP address fields similar to that explained in FIG. 1 based on information obtained during the BU of MS1 and from the first packet transmitted from MS1 to MS3. LMAP3 will similarly construct a table of IP address fields based on information obtained during the BU of MS3 and from the transmission of a reply packet from MS3 to MS1. The tables associated with each LMAP are separately kept and maintained by the respective LMAP's. Illustrative table entries corresponding to the scenario described in this paragraph are shown below.

Table Entry at LMAP12

| TE for LMAP12 | HoA1 | HoA3 | CoA1 | | HA1 | | IPGW1 | LMAP12 address |
|---|---|---|---|---|---|---|---|---|

Table Entry at LMAP3

| TE for LMAP3 | HoA3 | HoA1 | CoA3 | | HA3 | | IPGW3 | LMAP3 address |
|---|---|---|---|---|---|---|---|---|

It will be seen from the above table entries that the care-of address for the recipient and the identification of the home agent that supports the recipient are unknown. LMAP12 and LMAP4 periodically exchange table entry information over communication channel 134 so that the LMAP's can update the respective tables with relevant table entries from the table of the other. Relevant table entries can be readily discerned by each LMAP based on home address information for the mobile stations in active communications. For example, LMAP12 would recognize that the "TE for LMAP3" entry from the table kept by LMAP3 is relevant since it contains the address of MS1, HoA1, supported by LMAP12. Similarly, LMAP3 would recognize that the "TE for LMAP12" entry from the table kept by LMAP12 is relevant since it contains the address of MS3, HoA3, supported by LMAP3.

The process of matching relevant table entries, as explained for the embodiment as shown in FIG. 1, is carried out by LMAP12 and LMAP3 as part of the route optimization process for the embodiment of FIG. 3. In addition to the process explained for the embodiment of FIG. 1, LMAP12 and LMAP3 will coordinate with each other prior to sending out RO messages to point of attachment nodes 104 and 112, respectively. That is, it is preferable for each of these LMAP's to instruct the corresponding point of attachment nodes to alter the IP addresses for user packets transmitted between MS1 and MS3 at approximately the same time. Once the RO messages are received and implemented by the point of attachment nodes, a packet transmitted from MS1 to MS3 will utilize the packet header 136 and traverse the path: MS1, end node 104, end node 112, MS3. Similarly, a packet transmitted from MS3 to MS1 will traversed this path in reverse.

Although the embodiment of FIG. 3 had only two LMAP's, the same process can be utilized with a system having three or more LMAP's where each LMAP would periodically share its table entries with the others.

The LMAP in one example employs one or more computer-readable signal-bearing tangible media. The computer-readable signal-bearing media store software, firmware and/or assembly language for performing one or more portions of one or more embodiments of the invention. The computer-readable signal-bearing medium for the LMAP in one example comprise one or more of a magnetic, electrical, optical, biological, and atomic data storage tangible medium. For example, the computer-readable signal-bearing medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. For example, other formats and structures for storing IP address information other than a table could be utilized. If desired for various implementation preferences, the functionality of the LMAP relevant to RO could be performed by other nodes, e.g. a point of attachment node.

The scope of the invention is defined in the following claims.

We claim:

1. A method for implementing route optimization in an Internet protocol (IP) telecommunication network that supports wireless mobile stations (MSs) comprising the steps of:
   identifying and storing IP address information related to MSs in records at a local mobility anchor point (LMAP) that is coupled to a home agent (HA) node, where the records contain IP addresses associated with the ongoing flow of packets containing user entered information for the subject MSs;
   in response to recognizing an ongoing user communication session between the first and second MSs is in progress with corresponding IP addresses for the first and second MS set by the respective HA node, comparing the records by the LMAP to determine matching pairs of records where a matching pair of records represents that a first MS of a first record of the matching pair is engaged in a communication session with a second MS of a second record of the matching pair;
   determining, by the LMAP, first and second points of attachment nodes of the telecommunication network that support the first and second MS, respectively, based on IP address information contained in a matching pair of records associated with the first and second MS;
   identifying, by the LMAP, routing data initially established by said HA node that defines a route for data packets associated with said ongoing user communication session;
   transmitting, by the LMAP, a route optimization (RO) message to each of the first and second point of attachment nodes where the RO message includes an IP address of the other point of attachment node, each of the RO message include a request for the first and second point of attachment nodes to address packets sent between the first and second MS with a source address of one of the first and second point of attachment nodes and a destination address of the other of the first and second point of attachment nodes,
   upon receiving the RO messages, altering the initially defined route of IP packets by utilizing a different route that employs fewer nodes than the initially defined route.

2. The method of claim 1 wherein the step of identifying and storing IP address information comprises reading IP address information from packets associated with a binding update between an MS and the home agent.

3. The method of claim 1 wherein the step of identifying and storing IP address information comprises reading IP address information from packets associated with the transmission of information entered by the user of one MS between the one MS and another MS.

4. The method of claim 1 wherein the step of comparing comprises determining a matching pair of records has been found when each of the records in the pair contains IP addresses associated with the same two MSs.

5. The method of claim 1 further comprising supporting the first MS by a first LMAP and supporting the second MS by a second LMAP wherein the first and second LMAPs each practice the steps of claim 1 for the respective first and second MSs.

6. The method of claim 5 further comprising transmitting the records stored in each of the LMAPs to the other of the LMAPs so that each LMAP will have access to sufficient records to permit a matching pair of records to be determined where one of the records resides on one LMAP and the other record of the matching pair resides on another LMAP.

7. A local mobility anchor point (LMAP) coupled to a home agent (HA) node and adapted to implement route optimization in an Internet protocol (IP) telecommunication network that supports wireless mobile stations (MSs) comprising:
   means for identifying and storing IP address information related to MSs in records at a local mobility anchor point (LMAP), where the records contain IP addresses associated with the ongoing flow of packets containing user entered information for the subject MSs;
   means for comparing the records to determine matching pairs of records where a matching pair of records represents that a first MS of a first record of the matching pair is engaged in a communication session with a second MS of a second record of the matching pair, in response to recognizing an ongoing user communication session between the first and second MSs is in progress with corresponding IP addresses for the first and second MS set by the respective HA node;
   means for determining an IP address of first and second end nodes based on IP address information contained in a matching pair of records associated with the first and second MS, where the first and second point of attachment nodes in the telecommunication network support the first and second MS, respectively;
   means for identifying, by the LMAP, routing data initially established by said HA node that defines a route for data packets associated with said ongoing user communication session;
   means for transmitting a route optimization (RO) message to each of the first and second point of attachment nodes where the RO message includes an IP address of the other point of attachment node, the RO messages includes a request for the first and second point of attachment nodes to address packets sent between the first and second MS with a source address of one of the first and second point of attachment nodes and a destination address of the other of the first and second point of attachment nodes,
means for altering the initially defined route of IP packets and utilizing a different route that employs fewer nodes than the initially defined route.

8. The LMAP of claim 7 wherein the means for identifying and storing IP address information comprises means for reading IP address information from packets associated with a binding update between an MS and a home agent.

9. The LMAP of claim 7 wherein the means for identifying and storing IP address information comprises means for reading IP address information from packets associated with the transmission of user information between one MS and another MS.

10. The LMAP of claim 7 wherein the means for comparing comprises means for determining a matching pair of records has been found when each of the records in the pair contains IP addresses associated with the same two MSs.

11. An apparatus adapted to implement route optimization in an Internet protocol (IP) telecommunication network that supports wireless mobile stations (MSs) comprising:
    first and second local mobility anchor points (LMAPs) supporting first and second MS, respectively, each LMAP including:
    means for identifying and storing IP address information related to MSs in records at a local mobility anchor point (respective LMAP), where the records contain IP addresses associated with the ongoing flow of packets containing user entered information for the subject MSs;
    means for comparing the records to determine matching pairs of records where a matching pair of records represents that a first MS of a first record of the matching pair is engaged in a communication session with a second MS of a second record of the matching pair, said means for comparing making the determination of matching pairs after an ongoing user communication session between the first and second MSs is in progress with corresponding IP addresses for the first and second MS set by one or more home agent (HA) nodes;
    means for determining an IP address of first and second point of attachment nodes based on IP address information contained in a matching pair of records associated with the first and second MS, where first and second point of attachment nodes in the telecommunication network support the first and second MS, respectively;
    means for identifying, by the LMAP, routing data initially established by said HA node that defines a route for data packets associated with said ongoing user communication session;
    means for transmitting a route optimization (RO) message to each of the first and second point of attachment nodes where the RO message includes an IP address of the other point of attachment node, the RO messages includes a request for the first and second point of attachment nodes to address packets sent between the first and second MS with a source address of one of the first and second point of attachment nodes and a destination address of the other of the first and second point of attachment nodes,
    means for, upon receiving the RO messages, altering the initially defined route of IP packets, at said first and second points of attachment, and utilizing a different route that employs fewer nodes than the initially defined route.

12. The apparatus of claim 11 further comprising means for transmitting the records stored in each of the LMAPs to the other of the LMAPs so that each LMAP will have access to sufficient records to permit a matching pair of records to be determined where one of the records resides on one LMAP and the other record of the matching pair resides on another LMAP.

13. The method of claim 1 wherein the RO messages represent a request for the first point of attachment node to alter the destination address of first packets received from the first MS directed to the second MS so that the destination address of the first packets is the address of the second point of attachment node serving the second MS, and requesting the second point of attachment node to alter the destination address of second packets received from the second MS directed to the first MS so that the destination address of the second packets is the address of the first point of attachment node serving the first MS.

14. The method of claim 13 wherein the first packets received at the first point of attachment node from the first MS directed to the second MS do not contain the address of the second point of attachment node and the second packets received at the second point of attachment node from the second MS directed to the first MS do not contain the address of the first point of attachment node.

15. The LMAP of claim 7 wherein the RO messages represent a request for the first point of attachment node to alter the destination address of first packets received from the first MS directed to the second MS so that the destination address of the first packets is the address of the second point of attachment node serving the second MS, and requesting the second point of attachment node to alter the destination address of second packets received from the second MS directed to the first MS so that the destination address of the second packets is the address of the first point of attachment node serving the first MS.

16. The LMAP of claim 15 wherein the first packets received at the first point of attachment node from the first MS directed to the second MS excludes the address of the second point of attachment node and the second packets received at the second point of attachment node from the second MS directed to the first MS do not contain the address of the first point of attachment node.

17. The apparatus of claim 11 wherein the RO messages represent a request for the first point of attachment node to alter the destination address of first packets received from the first MS directed to the second MS so that the destination address of the first packets is the address of the second point of attachment node serving the second MS, and requesting the second point of attachment node to alter the destination address of second packets received from the second MS directed to the first MS so that the destination address of the second packets is the address of the first point of attachment node serving the first MS.

18. The apparatus of claim 17 wherein the first packets received at the first point of attachment node from the first MS directed to the second MS do not contain the address of the second point of attachment node and the second packets received at the second point of attachment node from the second MS directed to the first MS do not contain the address of the first point of attachment node.

* * * * *